(12) United States Patent
Watanabe et al.

(10) Patent No.: US 6,696,037 B1
(45) Date of Patent: Feb. 24, 2004

(54) METHOD OF RECOVERING SULFUR FROM MINERALS AND OTHER SULFUR-CONTAINING COMPOUNDS

(75) Inventors: Yoshiyuki Watanabe, Akita (JP); Toyohisa Fujita, Akita (JP); Kaoru Saruta, Gojome-cho (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/676,513

(22) Filed: Oct. 2, 2000

(30) Foreign Application Priority Data

Aug. 8, 2000 (JP) ........................... 2000-239675

(51) Int. Cl.⁷ ................ C01B 17/00; C01G 9/00; C22B 19/00
(52) U.S. Cl. ................ 423/578.4; 423/578.1; 423/578.2; 423/109; 423/110; 205/607; 205/608
(58) Field of Search .............. 423/578.1, 578.2, 423/578.4, 109, 110; 205/607, 608

(56) References Cited

U.S. PATENT DOCUMENTS

| | | | | |
|---|---|---|---|---|
| 2,877,100 A | * | 3/1959 | Hartley et al. ........... | 423/578.1 |
| 3,102,792 A | * | 9/1963 | Eads et al. ............... | 423/578.1 |
| 3,838,979 A | * | 10/1974 | Sims ........................ | 423/578.1 |
| 3,976,743 A | | 8/1976 | Landucci et al. | |
| 5,770,170 A | * | 6/1998 | Collins et al. ............ | 423/98 |
| 5,824,282 A | * | 10/1998 | Nagata et al. ........... | 423/578.1 |

FOREIGN PATENT DOCUMENTS

| | | |
|---|---|---|
| EP | 451 456 A1 | 10/1991 |
| JP | 2856933 B2 | 11/1998 |
| JP | 2001-214224 A | 8/2001 |
| WO | 91/09146 * | 6/1991 |
| WO | WO 95/15918 | 6/1995 |

OTHER PUBLICATIONS

Database WPI, Section Ch, Week 198907, Derwent Publications Ltd., London, GB; AN 1989–047054 XP–002183053 of BR 8 702 472 A (DE Souza Santos P), Jan. 3, 1989.

Database WPI, Section Ch, Week 198924, Derwent Publications Ltd., London, GB; AN 1989–176909 XP–002183054 of SU 1 444 296 A (Krivosheev I D), Dec. 15, 1988.

Database WPI, Section Ch, Week 198225, Derwent Publications Ltd., London, GB; AN 1982–52122E XP–002183055 of SU 859 288 A (Kaza Poly), Aug. 30, 1981.

* cited by examiner

*Primary Examiner*—Steven Bos
(74) *Attorney, Agent, or Firm*—Frishauf, Holtz, Goodman & Chick, P.C.

(57) ABSTRACT

A sulfurous compound such as a sulfur-rich "float" (concentrate) obtained by flotation of the residue from the leaching of a zinc concentrate is heated at a temperature not lower than the melting point of sulfur but below its boiling point, preferably not higher than 200° C., more preferably not higher than 140° C., and the evolving gas containing sulfur vapor is cooled at a temperature less than the melting point of sulfur, preferably at ordinary temperature, to condense sulfur.

12 Claims, 2 Drawing Sheets

METHOD OF RECOVERING SULFUR FROM MINERALS AND OTHER SULFUR-CONTAINING COMPOUNDS

BACKGROUND OF THE INVENTION

This invention relates to a method for separating and recovering elemental sulfur (hereunder referred to simply as "sulfur") from minerals and other sulfur-containing (sulfurous) compounds, particularly from the residues obtained in the leach step in a hydrometallurgical zinc production process, wherein zinc is leached from a zinc concentrate which is concentrated zinc sulfide.

Steady efforts are being made to improve upon the zinc production technology. A particularly important proposal can be found in Japanese Patent No. 2856933 under the title "A Wet Metallurgical Method for Treating Zinc Sulfide-Containing Raw Concentrate". According to this method, zinc present in a zinc concentrate in an amount stoichiometrically equal to the iron content in a calcine, the product of oxidizing roasting of the concentrate, is directly leached from the concentrate and recovered as soluble zinc, thereby increasing the yield of zinc production. This is an excellent approach in that the yield of electrolytic zinc production can be increased without enhancing the capacities of the existing oxidative roasting furnaces and sulfuric acid production facilities.

For industrial practice, however, the concentration of ferric ions which are indispensable for direct leaching of zinc sulfide in zinc concentrates is low and, hence, the yield of direct leaching from the zinc concentrate is too much limited to realize a significant increase in the throughput of zinc production. With a view to solving this problem, the present inventors developed a method in which the residue from neutral leaching and the iron precipitate obtained in the hydrometallurgical zinc production process was repulped and leached to realize a significant increase in the yield of direct leaching from the zinc concentrate, thereby achieving a significant increase in the yield of electrolytic zinc production without enhancing the capacities of the existing oxidizing roasting furnaces and sulfuric acid production facilities (commonly assigned Japanese Patent Application No. 021143/2000).

A problem with this method concerns the two different forms of sulfur that occur in zinc concentrates, one being as a metal sulfide and the other in the free state. As the yield of direct leaching from the zinc concentrate increases, there occurs a further increase in the generation of free sulfur in the leaching step; this has presented the need to develop a more efficient way to recover the generated sulfur from the residue from the leaching step.

The following two methods have conventionally been used to separate and recover sulfur from sulfurous compounds:

(1) the residue from the leaching of a sulfide ore is subjected to flotation and the resulting sulfur-rich "float" (sulfur concentrate) is heated to a temperature higher than the sulfur's melting point (119° C.) in order to melt sulfur; and the molten "float" is then filtered to separate and recover the molten sulfur;

(2) a sulfurous compound such as the "float" is heated to a temperature higher than the sulfur's boiling point (445° C.), preferably between 450 and 500° C., so that sulfur is distilled for separation and recovery.

However, these methods are not industrially applicable for sulfur recovery in the zinc producing method proposed in Japanese Patent Application No. 021143/2000. In the first method in which the sulfur in the "float" is melted and then recovered by filtering, the impurities in the "float" are most likely to contaminate the molten sulfur in the process of filtering and the sulfur that can be recovered contains more impurities than the sulfur recovered from the ordinary oil refining process and need be rendered to have an adequately higher purity by a subsequent refining step. What is more, if the temperature control is not appropriate, the once melted sulfur returns to a solid state, increasing the frequency of operating troubles such as a failure to filter the molten "float". As a further problem, sulfur which has a low chemical reactivity at ordinary temperatures becomes highly reactive at elevated temperatures and forms sulfides with almost all metals except gold and platinum, as well as combines with many non-metallic elements. Hence, filtering the heated "float" and recovering the molten sulfur requires increased operating cost inclusive of plant maintenance cost.

In the second method, considerable thermal energy is required to heat the "float" or other sulfurous compounds to the temperature of 450–500° C. and the operating cost is even higher than in the first method, discouraging the zinc smelter from industrial practice of the second method. What is more, the temperature to which the sulfurous compound is heated is closer to 630° C. (the catch fire point of sulfur) than is the temperature at which sulfur is heated to melt in the first method. This has posed the need to develop a safer method of sulfur recovery.

SUMMARY OF THE INVENTION

The present invention has been accomplished under these circumstances and has as an object providing an efficient and low-cost method of recovering high-purity sulfur from sulfurous compounds such as the sulfurous residues from the step of leaching zinc concentrates.

The present inventors made intensive studies in order to attain this object. As a result, they found that quite contrary to the common sense underlying the previous practice of heating the "float" or other sulfurous compounds to a temperature higher than the sulfur's boiling point (445° C.) in order to achieve evaporative separation of sulfur, sulfur had an unexpectedly high vapor pressure even in the liquid phase at temperatures near its melting point. The inventors continued their studies on the basis of this finding and finally accomplished the present invention by which high-purity sulfur can be efficiently recovered from sulfurous compounds such as the residues from the leaching of zinc concentrates at temperatures below the boiling point of sulfur.

The stated object of the invention can be attained by a method of recovering sulfur from a sulfurous compound by the steps of heating the sulfurous compound to a temperature not lower than the melting point of sulfur but less than its boiling point and cooling the evolving gas containing sulfur vapor to a temperature less than the melting point of sulfur so as to condense the sulfur vapor.

Preferably, the sulfurous compound is a sulfur-rich "float" obtained by flotation of the sulfurous residue from the step of leaching a zinc concentrate in a hydrometallurgical zinc production process.

Preferably, said hydrometallurgical zinc production process comprises the steps of:

(1) (neutral leach step) subjecting calcine (zinc oxide) to neutral leaching with a return acid containing free sulfuric acid from the electrowinning step in the zinc production system to produce a neutral leach liquor (zinc sulfate solution), said calcine being obtained by oxidizing roasting of part of a zinc concentrate;

(2) (zinc concentrate leach step) repulping the zinc ferrite containing residue from the first step with the return acid (spent electrolyte) from the electrowinning step in said zinc production system, adding a zinc concentrate to the resulting pulp and leaching the zinc sulfide in the added zinc concentrate at a temperature between 90° C. and the boiling point of the pulp at atmospheric pressure;

(3) (iron oxidizing step) adding an oxidizer to the leach liquor from the second step to oxidize the ferrous ions in the leach liquor to ferric ions and adding a zinc oxide based calcine to the leach liquor as a neutralizer, thereby recovering the iron in the leach liquor as an iron precipitate., and supplying at least part of the iron precipitate as an iron source to the second step while recycling the neutralized liquor to the first step;

(4) (residue treating step) treating the iron precipitate from the third step; and (5) (flotation step) subjecting the sulfurous residue from the second step to flotation.

DETAILED DESCRIPTION OF THE INVENTION

Figure 1:
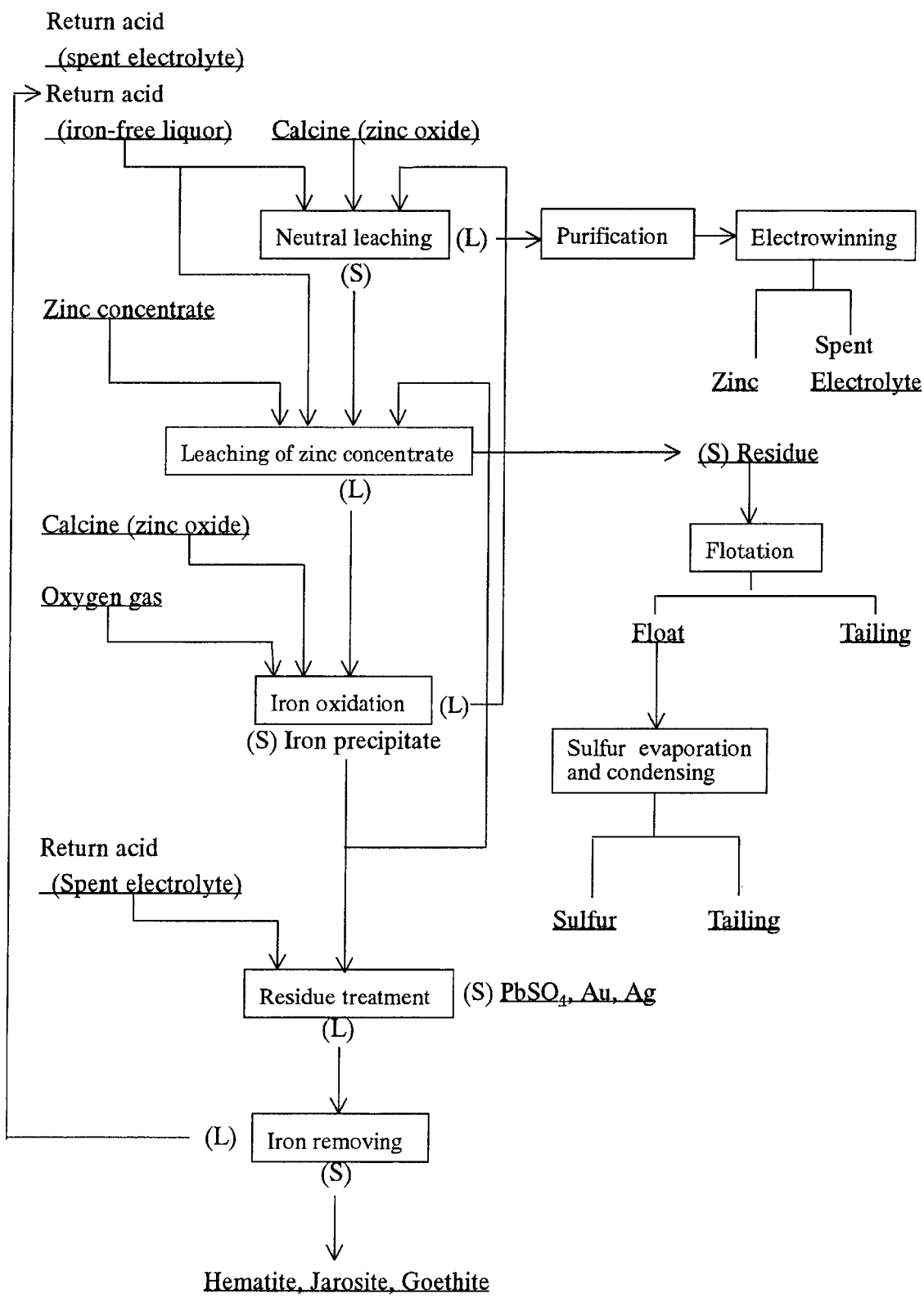
FIG. 1 is a flowsheet for a hydrometallurgical zinc production process incorporating the sulfur recovery method of the invention.

The sulfur recovery method of the invention is now described with reference to the flowsheet in FIG. 1, in which (L) stands for a liquor and (S) a solid. The method of the invention can advantageously be applied to the residue from the leaching of a zinc concentrate in the hydrometallurgical zinc production process outlined in the flowsheet. The method is also applicable to various other sulfurous compounds.

In the first step (neutral leaching) in the recovery method of the invention, a calcine (zinc oxide) obtained by oxidizing roasting of a zinc concentrate is leached with a return acid (spent electrolyte) that contains free sulfuric acid and which occurs in the electrowinning step in a zinc production system and with a return acid (iron-free liquor) from an iron removing step (to be described later), thereby producing a neutral leach liquor (zinc sulfate solution), which is then passed through a cleaning step to be supplied into an electrowinning step to thereby recover zinc.

The zinc ferrite-containing residue that remains undissolved in the neutral leaching step is supplied to the second step (zinc concentrate leaching) in the method of the invention together with part of the iron precipitate being supplied from the third step (iron oxidation) in the method of the invention. In this zinc concentrate leaching step, the abovementioned zinc ferrite-containing residue and the iron precipitate are repulped with the return acids from the electrowinning step and the iron removing step; another part of the zinc concentrate is added to the repulp and the zinc sulfide in the zinc concentrate is leached at atmospheric pressure. The leaching temperature is between 90° C. and the boiling point of the pulp and the leaching time is between 2 and 3 hours. As a result of this treatment, the iron in the zinc ferrite and that in the iron precipitate dissolve to generate trivalent ferric ions which, in turn, are reduced with the zinc concentrate to divalent ferrous ions. The zinc in the zinc sulfide in the zinc concentrate mostly dissolves out in a zinc sulfate solution whereas the sulfur in the zinc sulfide is mostly separated as elemental sulfur. The reaction involving these phenomena is expressed by the following equation:

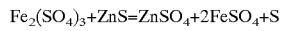

The amount of the zinc concentrate (ZnS) added in the second step of the invention method is from about one to about 1.2 times the stoichiomtric quantity.

The insoluble residue from the second step is subjected to flotation in the fifth step of the invention method and sulfur and sulfides are selectively recovered as the floating concentrate (hereunder simply referred to as "float") whereas lead sulfate, silicon oxide, barium sulfate, etc. are recovered as tailings. The insoluble residue consists of finely divided particles which are easy to handle, allow for efficient evaporation of sulfur and do not require a large-scale grinding operation; therefore, it can advantageously be subjected to flotation.

The "float" is heated in the next sulfur evaporating and condensing step. The sulfur in the "float" comprises fine amorphous particles which will readily evaporate upon heating to a temperature above its melting point. For heating, an inert gas such as nitrogen is used as a carrier gas. Either in a wet state or after being dried, the "float" is heated to a temperature not lower than the sulfur's melting point (119° C.) but less than its boiling point (445° C.), preferably at 200° C. or below, more preferably at 160° C. or below. Beyond 160 ° C., liquid sulfur undergoes transformation to become more viscous and tends to evaporate at a slower speed. Beyond 200° C., the increase in the evaporation speed becomes sluggish whereas the required thermal energy increases. In addition, sulfur becomes active to increase the chance of plant deterioration and it also tends to react with the various substances in the "float".

Subsequently, the carrier gas containing the evaporated sulfur is cooled to condense the sulfur. The cooling temperature is less than the sulfur's melting point (119° C.), preferably at ordinary temperature. For cooling, the sulfur vapor may be brought into direct contact with a cooling medium such as water; alternatively, a water jacket or other indirect cooling medium may be employed.

In the sulfur recovery method of the invention, the evaporated sulfur may be aspirated while the sulfur is in a molten state at temperatures below the boiling point of sulfur and the sulfur vapor is then cooled. The sulfur obtained is almost 100% pure and at least 85% of sulfur can be recovered from the "float". The object of the invention can be attained at atmospheric pressure but if the atmosphere for heating the "float" is at reduced pressure, faster evaporation of sulfur from the "float" can be achieved at a lower temperature, offering benefits such as reduction in the energy cost.

Industrial methods for treating the "float" to recover sulfur include the following: for continuous heat treatment, the feed ("float") is transported on a belt to pass through a heating furnace, or supplied onto a rotating disk in a heating furnace, or fed into a cylindrical rotating furnace; for sulfur recovery, the resulting sulfur vapor is aspirated from within the heating furnace.

The leach liquor from the second step (zinc concentrate leaching) of the invention method contains large amounts of zinc and iron, so in order to separate the two elements, the leach liquor is sent to the third step (iron oxidation), in which oxygen gas is blown into the leach liquor as an oxidizer, the calcine (zinc oxide) is added as a neutralizer and iron is precipitated at a pH of 3–4 at a temperature of 80° C. or more so that the iron content in the leach liquor is recovered as an iron precipitate. The reaction involving these phenomena is expressed by the following equation:

$$2FeSO_4+2ZnO+0.5O_2+H_2O=2FeOOH+2ZnSO_4$$

If the pH for this reaction is less than 3, the oxidation rate decreases; if the pH exceeds 4, zinc oxide is not efficiently leached. If the reaction temperature is less than 80° C., both the oxidation rate and the leaching speed of zinc oxide decrease. The iron precipitate contains insoluble carryovers from the calcine such as gold, silver and lead and these are also precipitated and recovered together with iron. As a result of addition of the calcine (zinc oxide) for the purpose of hydrolyzing the iron, the liquor has its zinc concentration elevated abruptly and is returned to the first or neutral leaching step.

As already mentioned, part of the iron precipitate is returned as an additional supply to the second or zinc concentrate leaching step, where it is dissolved by sulfuric acid to generate ferric sulfate according to the following reaction equation:

$$2FeOOH+3H_2SO_4=Fe_2(SO_4)_3+4H_2O$$

As already mentioned, the generated ferric sulfate further converts the zinc concentrate to a soluble salt, so it is used not only to enhance the direct leaching of the zinc concentrate but also to increase the yield of sulfur generation. The amount of the iron precipitate to be returned to the zinc concentrate leaching step is so set that the sum of the iron in the zinc ferrite from the neutral leaching step and the iron in the returned iron precipitate is at least 30 g/L, preferably between 30 and 60 g/L, in terms of the iron concentration in the pulp being treated by the zinc concentrate leaching step. If the iron concentration is less than 30 g/L, no adequate zinc leaching is accomplished; if the iron concentration exceeds 60 g/L, the effect of returning the iron precipitate to the zinc concentrate leach step is saturated.

The remainder of the iron precipitate is sent to the next (fourth) step for residue treatment such as by $SO_2$ leaching or HAL (hot acid leaching); in this step, the return acid (spent electrolyte) is used as a leaching agent to separate the insoluble residues such as lead sulfate, gold and silver. The iron-containing liquor is then transferred to the iron-removing step, where the iron content is removed as hematite, jarosite or goethite. As already mentioned, the resulting iron-free liquor is recycled to the neutral leach step and the zinc concentrate leach step.

The following examples are provided for the purpose of further illustrating the present invention but are in no way to be taken as limiting.

EXAMPLE 1

Residues from the zinc concentrate leach step in the flowsheet in FIG. 1 were used as a feed and subjected to flotation to evaluate its effectiveness in separating sulfur.

The feed (70.72 g) was repulped with water and subjected to primary flotation for 10 minutes, producing 39.95 g of "float" I and 30.77 g of tailing I. No liquor modification was effected in the primary flotation.

The grades, contents and distributions of various ingredients in the feed are shown in Table 1; data for the same parameters are set forth in Table 2 (for "float" I) and in Table 3 (for tailing I).

TABLE 1

Feed (residues from zinc concentrate leaching): 70.72 g

| | Zn | Fe | Cu | Pb | SiO$_2$ | S |
|---|---|---|---|---|---|---|
| Grade (%) | 1.7 | 9.1 | 0.4 | 13.8 | 8.9 | 44.5 |
| Content (g) | 1.23 | 6.46 | 0.26 | 9.77 | 6.27 | 31.47 |
| Distribution (%) | 100 | 100 | 100 | 100 | 100 | 100 |

TABLE 2

"float" I: 39.95 g

| | Zn | Fe | Cu | Pb | SiO$_2$ | S |
|---|---|---|---|---|---|---|
| Grade (%) | 1.2 | 10.8 | 0.4 | 2.5 | 2.4 | 64.7 |
| Content (g) | 0.48 | 4.30 | 0.17 | 1.00 | 0.97 | 25.84 |
| Distribution (%) | 39 | 67 | 66 | 10 | 15 | 82 |

TABLE 3

Tailing I: 30.77 g

| | Zn | Fe | Cu | Pb | SiO$_2$ | S |
|---|---|---|---|---|---|---|
| Grade (%) | 2.4 | 7.0 | 0.3 | 28.5 | 17.2 | 18.3 |
| Content (g) | 0.75 | 2.16 | 0.09 | 8.77 | 5.30 | 5.63 |
| Distribution (%) | 61 | 33 | 34 | 90 | 85 | 18 |

Using 20 g/t of a high-molecular compound (lignin) as a modifier and 200 g/t of a frother, tailing I was subjected to secondary flotation at an adjusted pH of 3.1 to produce 8.40 g of "float" II and 22.37 g of tailing II. The tailing II had a particle size of about 50 μm.

The grades, contents and distributions of various ingredients are shown in Table 4 (for "float" II) and in Table 5 (for tailing II).

TABLE 4

"float" II: 8.40 g

| | Zn | Fe | Cu | Pb | SiO$_2$ | S |
|---|---|---|---|---|---|---|
| Grade (%) | 3.1 | 11.9 | 0.4 | 3.1 | 2.5 | 65.7 |
| Content (g) | 0.26 | 1.00 | 0.03 | 0.26 | 0.21 | 5.52 |
| Distribution (%) | 21 | 15 | 12 | 3 | 3 | 18 |

TABLE 5

Tailing II: 22.37 g

| | Zn | Fe | Cu | Pb | SiO$_2$ | S |
|---|---|---|---|---|---|---|
| Grade (%) | 2.2 | 5.2 | 0.3 | 38.0 | 22.7 | 0.5 |
| Content (g) | 0.49 | 1.16 | 0.06 | 8.50 | 5.09 | 0.12 |
| Distribution (%) | 40 | 18 | 22 | 87 | 81 | 0 |

It is therefore clear that by two cycles of flotation, almost all sulfur could be collected in the "float".

EXAMPLE 2

A zinc concentrate containing 49.84% Zn, 8.35% Fe, 0.67% elemental S (28.20% total S), 1.08% Cu and 0.54% Pb was subjected to 3-hr leaching under the following conditions:

reaction temperature, 95° C.; initial ferric ion concentration, 60 g/L; and agitating speed, 1000 rpm. The residue from the leaching step contained 1.39 Zn, 6.27% Fe, 66.73% elemental S, and 69.38% total S.

This residue was subjected to flotation to produce a "float". In the flotation, 20 g/t of a high-molecular compound (lignin) as a modifier and 200 g/t of a frother were used. The "float" was filtered and dried at 80° C. to reduce the water content to 1% or less. The results of analysis of the "float" and the amounts of impurities in the recovered sulfur are shown in Table 6.

TABLE 6

| Element | Zn | Fe | Cu | Pb |
| --- | --- | --- | --- | --- |
| Concentrate (%) | 1.54 | 10.95 | 0.42 | 2.61 |
| Recovered sulfur (ppm) | <1 | 9 | <1 | <1 |

Figure 2:
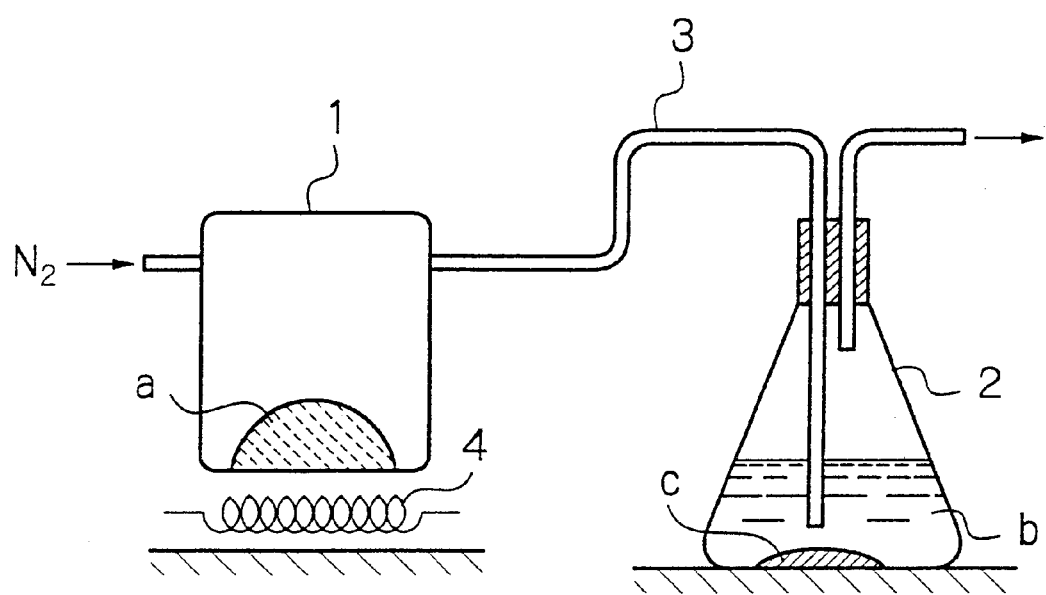
FIG. 2 shows the apparatus used in Example 2 of the invention to recover sulfur by heating the "float" obtained in the flotation step.

Then, as shown in FIG. 2, the "float" a was charged into a heating reaction vessel 1 which was connected to a conical flask 2 via a piping 3. The conical flask 2 was sealed with cooling water b. Nitrogen ($N_2$) was used as a carrier gas for conveying sulfur vapor into the cooling water in the conical flask. The "float" a in the reaction vessel 1 was heated up to 140° C. with a heater 4 and held at that temperature for 2 hours. The sulfur evaporating from the "float" a accompanied the carrier gas which was directed into the conical flask 2, cooled by the water seal at 20° C. and caught there to precipitate as solid sulfur c; the efficiency of sulfur recovery was 85% and the contents of impurities in the recovered sulfur were as shown in Table 6. Thus, almost 100% pure sulfur could be recovered in a yield of at least 85%.

As described above, according to the invention, sulfur can be consistently evaporated and separated from sulfurous compounds or the "float" having the sulfur content increased by flotation of a residue from the leaching of a zinc concentrate. This is effective in solving the operating problems with the conventional sulfur recovery systems and producing high-purity sulfur that need not be subjected to further purification. What is more, the method of the invention involves much lower temperatures in the heating step than the conventional distillation approach, so that high-purity sulfur can be recovered with less thermal energy, hence, at a lower cost.

When applied to a hydrometallurgical zinc production process for enhanced zinc production that enables direct leaching of zinc concentrates by recycling ferric ions, the present invention offers the advantage of providing an easy way to deal with the concomitant increase in sulfur generation.

The term "sulfurous compound" is used to mean "sulfur-containing" compound or material and is inclusive of but not limited to tetravalent sulfur compounds.

What is claimed is:

1. A method of recovering sulfur from a float comprising elemental sulfur-containing compounds inclusive of minerals, in which the sulfur comprises amorphous particles, said method comprising:
   (i) heating the elemental sulfur-containing compound containing sulphur as amorphous particles to a temperature not lower than the melting point of sulfur but less than 200° C. to produce sulfur vapor from the amorphous sulfur particles;
   (ii) mixing a carrier gas with the sulfur vapor;
   (iii) removing the mixture of carrier gas and sulfur vapor from the elemental sulfur containing compounds; and thereafter
   (iv) cooling the gas containing sulfur vapor to a temperature less than the melting point of sulfur, to recover condensed sulfur.

2. The method according to claim 1, further comprising leaching a zinc concentrate in a hydrometallurgical zinc production process and obtaining said elemental sulfur-containing compound as a sulfur-rich concentrate obtained as said float by flotation of a sulfurous residue from said leaching.

3. The method according to claim 2, wherein said hydrometallurgical zinc production process comprises the steps of:
   (1) subjecting a zinc oxide based calcine to neutral leaching with a return acid containing free sulfuric acid from an electrowinning step in a hydrometallurgical zinc production system, to produce a zinc sulfate solution, said calcine being obtained by oxidizing roasting of part of a zinc concentrate;
   (2) repulping a zinc ferrite-containing residue from the first step with the return acid from the electrowinning step in said hydrometallurgical zinc production system, adding a zinc concentrate to a pulp resulting from said repulping and leaching the zinc sulfide in the added zinc concentrate at a temperature between 90° C. and the boiling point of the pulp at atmospheric pressure;
   (3) adding an oxidizer to a leach liquor from the second step to oxidize ferrous ions in she leach liquor to ferric ions and adding the calcine to the leach liquor as a neutralizer, thereby recovering iron in the leach liquor as an iron precipitate, and supplying at least part of the iron precipitate as an iron source to the second step while recycling a neutralized liquor to the first step;
   (4) transporting the remainder of the iron precipitate from the third step to another step for a further treatment; and
   (5) subjecting a sulfurous residue from the second step to flotation.

4. The process according to claim 1, wherein said heating of said elemental sulfur-containing compound comprises heating to a temperature not higher than 160° C.

5. The process according to claim 1, wherein said carrier gas is nitrogen.

6. The process according to claim 4, wherein said carrier gas is nitrogen.

7. The process according to claim 2, wherein said heating of said elemental sulfur-containing compound comprises heating to a temperature not higher than 160° C.

8. The process according to claim 7, wherein said carrier gas is nitrogen.

9. The process according to claim 2, wherein said carrier gas is nitrogen.

10. The process according to claim 3, wherein said carrier gas is nitrogen.

11. The process according to claim 3, wherein said heating of said elemental sulfur-containing compound comprises heating to a temperature not higher than 160° C.

12. The process according to claim 11, wherein said carrier gas is nitrogen.

* * * * *